RE. 25,900

Dec. 3, 1957  F. A. ROBINSON ET AL  2,815,308

METHOD OF MAKING A COMPOSITE SHEET

Filed Aug. 26, 1954  3 Sheets-Sheet 1

*INVENTORS*
FREDERICK A. ROBINSON
BY  GLENN L. HUSS

J. Warren Kinney, Jr.
ATTORNEY

Dec. 3, 1957 F. A. ROBINSON ET AL 2,815,308
METHOD OF MAKING A COMPOSITE SHEET
Filed Aug. 26, 1954 3 Sheets-Sheet 3
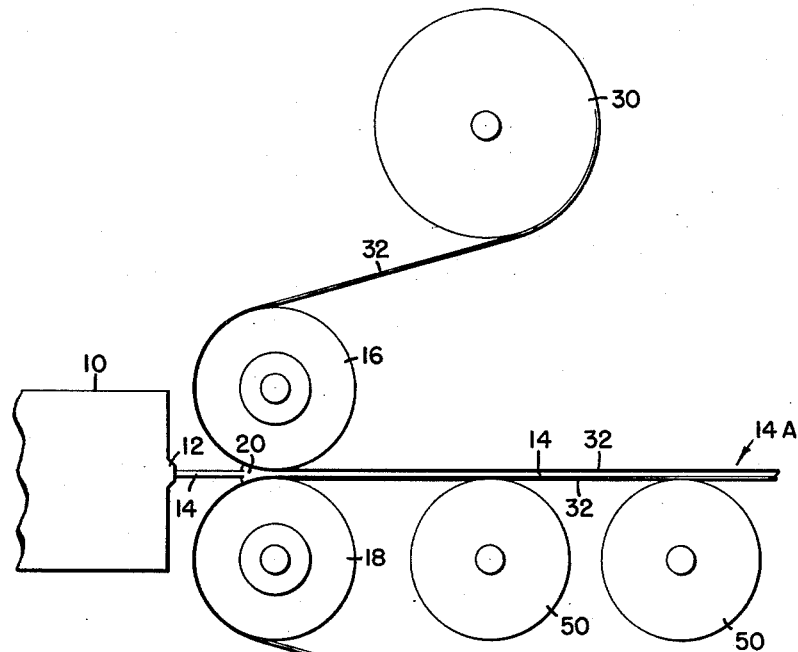
Fig. 3
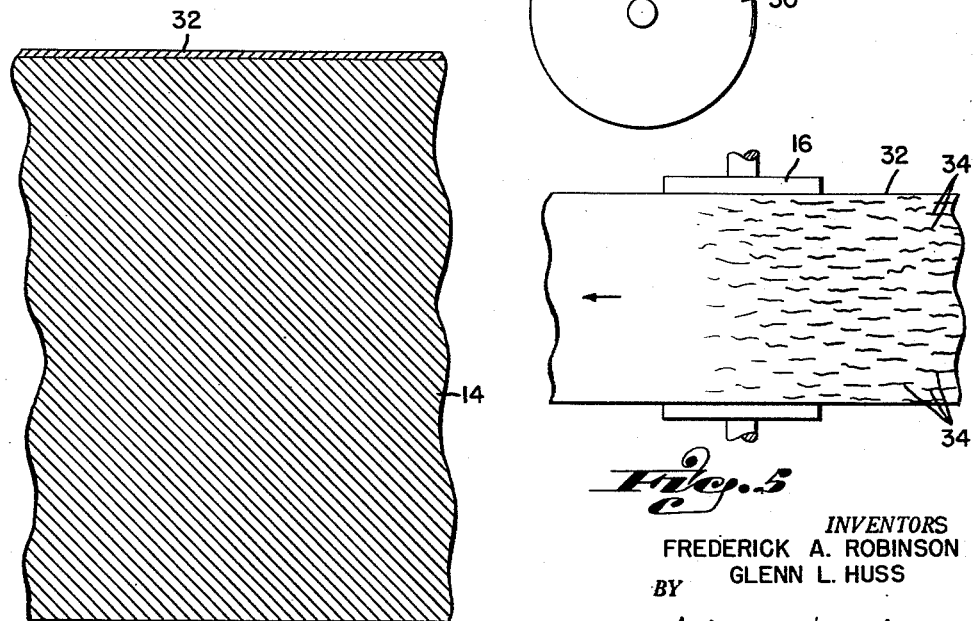
Fig. 4
Fig. 5
INVENTORS
FREDERICK A. ROBINSON
GLENN L. HUSS
BY
J. Warren Kenney, Jr.
ATTORNEY

United States Patent Office 2,815,308
Patented Dec. 3, 1957

2,815,308

METHOD OF MAKING A COMPOSITE SHEET

Frederick A. Robinson and Glenn L. Huss, Coleman, Mich., assignors to Robinson Manufacturing Incorporated, Coleman, Mich., a corporation of Michigan Application August 26, 1954, Serial No. 452,302

5 Claims. (Cl. 154—102)

This invention relates to a composite sheet of thermoplastic material and to a method of making same.

An object of the invention is to teach a method of providing an extruded, thermoplastic sheet with a smooth, hard, abrasion resistant surface.

Another object of the invention is to provide a sheet of extruded, high impact strength polystyrene having a smooth, hard, abrasion resistant outer surface comprising a thin film of straight polystyrene.

A further object of the invention is to teach a method of continuously fabricating a composite sheet by continuously extruding a sheet of inexpensive thermoplastic material having high impact strength characteristics and of continuously applying a very thin film of a compatible thermoplastic thereto immediately after being extruded and while the extruded sheet is still soft, hot and plastic, said film providing a smooth, hard, abrasive resistant surface to the sheet.

Still a further object of the invention is to teach a simple yet highly efficient method of deorientating a thin film of thermoplastic material for quickly and effectively removing the strains set up in the film incident to its manufacture.

Another object of the invention is to provide a composite sheet of thermoplastic material comprising a base sheet of a high impact strength polystyrene having a thin film of straight polystyrene welded directly to one or both of its surfaces for imparting a smooth, hard, abrasion resistant surface thereto.

Another object of the invention is to provide a composite sheet having the hereinabove described characteristics which may be cut, flexed, bent, stamped, punched, embossed and the like without affecting the bond between the sheet and film.

A further object of the invention is to provide a sheet having the hereinabove described characteristics which may be softened by reheating and then subjected to various forming processes, such as, by way of example, vacuum forming, without in any way injuriously affecting or loosening the bond between the film and base sheet.

These and other objects are attained by the means described herein and as disclosed in the accompanying drawings in which:

Fig. 3 is a view similar to Fig. 1 illustrating the manner in which thin films are simultaneously applied to both surfaces of an extruded sheet.

Fig. 4 is a sectional view on line 4—4 of Fig. 2 through a typical composite sheet having a thin film of a hard, smooth, abrasive resistant thermoplastic material welded to one surface of a sheet of high impact strength thermoplastic material, said view illustrating the relative thicknesses of the sheet and film.

Fig. 5 is a top elevation illustrating the manner in which a thin film of thermoplastic material is deorientated incident to its passage over a smooth roller heated to temperatures approximating the temperature at which the film is plasticized.

One of the primary objectives of the present invention is to provide a simple yet highly effective method for inexpensively producing, on a mass production basis, extruded sheets of inexpensive, high impact strength, thermoplastic material such as polystyrene, and of improving the outer surfaces of such extruded sheets with a thin film of straight polystyrene for providing a composite sheet having a smooth, hard, abrasion resistant surface which compares favorably with the excellent finishes usually associated with and provided on the more expensive types of plastics.

By way of example, sheets made of inexpensive polystyrene in accordance with the teachings of this invention are ideally adapted for use as lining panels in refrigerators, wherein the high impact strength sheet gives the necessary body and rigidity and the thin film of abrasive resistant thermoplastic material, welded thereto, provides a hard, smooth surface which is easily cleaned by a housewife.

Figure 1:
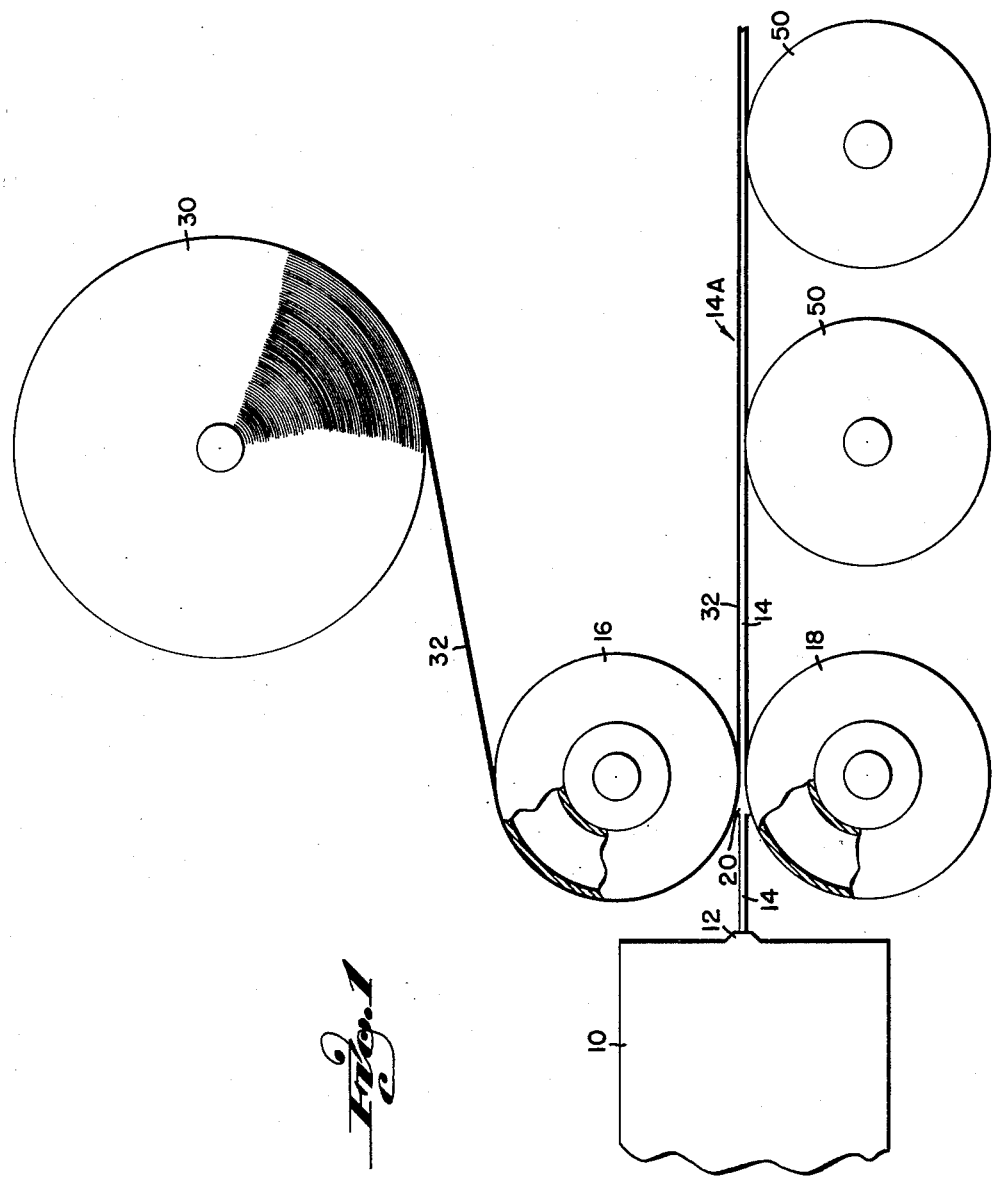
Fig. 1 is a side schematic view of a typical set-up useful in practicing the teachings of the subject invention for fabricating a composite sheet having the hereinabove described characteristics.
Figure 2:
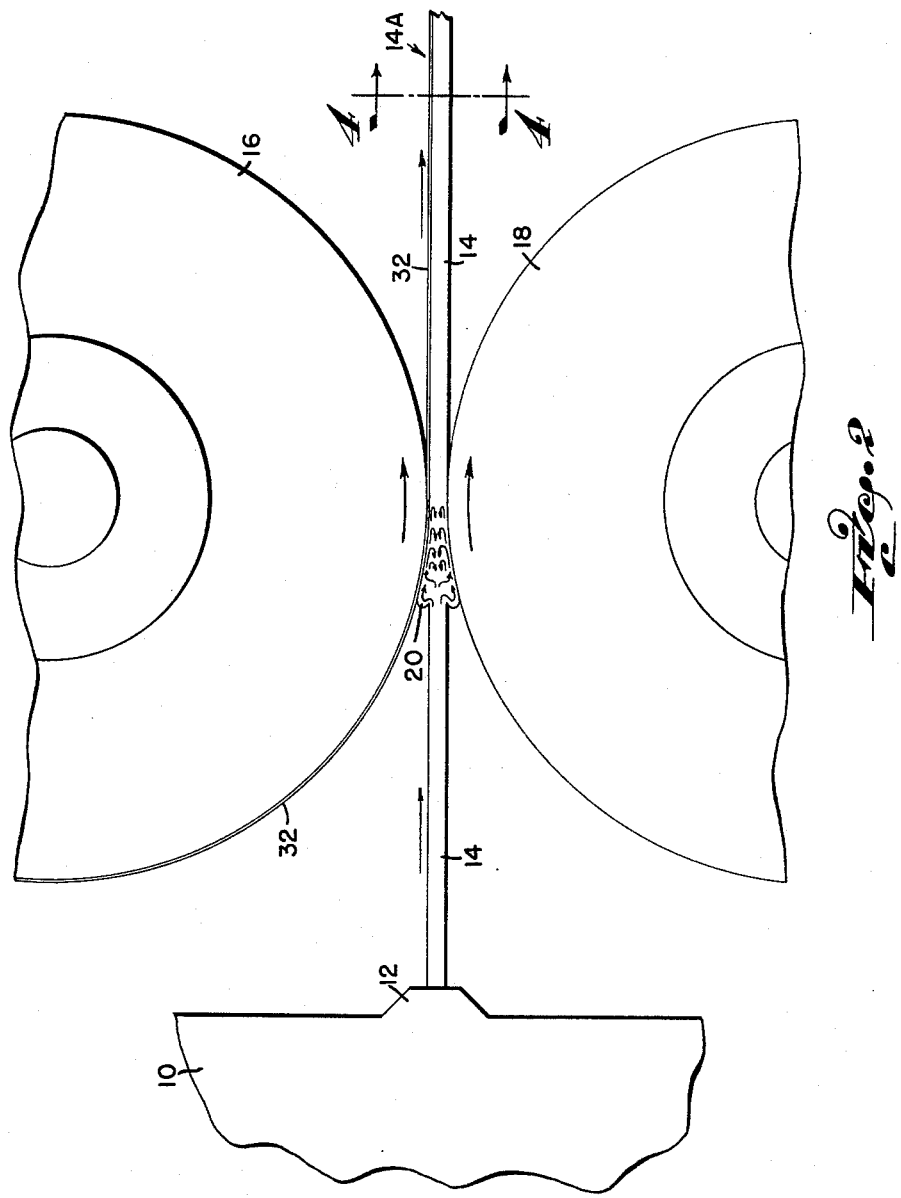
Fig. 2 is an enlarged view of a portion of Fig. 1 for more clearly illustrating the "inventory" of sheet material and the manner in which the thin film is applied thereto.

With particular reference to Figs. 1 and 2, the numeral 10 denotes generally a conventional extruder for continuously extruding a sheet of thermoplastic material from a pair of lips 12. The present invention is neither concerned with nor directed to the specific structural details of extruder 10 or of lips 12.

The material extruded from lips 12 comprises a thermoplastic having high impact strength characteristics such as, by way of example, a polystyrene including copolymers, which are added to the styrene base, or a regular polystyrene mechanically mixed with synthetic rubbers whereby to provide a product commercially known as a high impact strength polystyrene. It should be clearly understood that the raw material from which the extruded sheet is formed is commercially available as pellets, powders or the like which are fed into the extruder where they are rendered plastic or fluid by heating, milling, mixing, etc. prior to being discharged through lips 12.

The high impact strength polystyrene sheet 14 leaving lips 12 of the extruder is soft, plastic and hot at a temperature of from 375 to 380 degrees Fahrenheit, and having a mat surface.

Heretofore such extruded sheets have been discharged onto suitable conveyor means on which the soft sheet is allowed to cool and harden. However, in practicing our invention the hot, soft, plastic sheet immediately upon leaving the extruder is fed directly to and between a pair of vertically spaced, smooth, rotating, compression rollers 16 and 18, the spacing of which determines the final and overall thickness of the finished sheet discharged therefrom.

At this point it should be noted that by passing the hot, plastic, extruded sheet immediately between a pair of compression rollers the overall thickness of the sheet leaving the rollers will be quite uniform. In this connection it will be noted that the extruded sheet leaving lips 12 will vary considerably in thickness across its width despite the most diligent of efforts to maintain the lip openings uniform, said thickness variations being the result of a combination of factors independent of the spacing of the lips.

By means of our process we are able to obtain a continuously extruded sheet of substantially uniform thickness across its width, thereby providing a superior product at practically no additional effort or expense.

With reference now to Fig. 2, the numeral 20 denotes an inventory of the extruded material of sheet 14, said inventory extending across the entire width of the extruded sheet and being formed as a result of the compressive forces applied to the extruded sheet by rollers 16 and 18.

As clearly evident from Fig. 2, inventory 20 continuously moves in a fountain-like pattern indicated generally by the headed arrows wherein new material from the extruder is continuously supplied to replace the plastic mass which is continuously worked and milled as it is moved to and between the closest portions of rollers 16 and 18.

With reference now to Fig. 1, the numeral 30 denotes generally a roll of a continuous length of thin thermoplastic film 32, such as, by way of example, straight polystyrene, 1 mil thick. Such film-like material is commercially available and is produced by being pulled or drawn at a uniform rate from an elongate discharge orifice, wherein the width of orifice and rate of pulling determines the thickness of the film. Such thin films, however, are subject to the inherent disadvantage of including stresses and strains which are induced in and imparted to the film as it is being made, said strains being referred to in the art as orientation.

As used herein the term "straight" polystyrene refers to the polymer made by the polymerization of styrene as the sole monomer, and for the purpose of distinguishing such an unmodified form of polystyrene from those modified styrene plastics, such as, by way of example, high impact strength polystyrene, made by copolymerization of styrene with other unsaturated compounds or by the blending of other plastic materials with straight, or unmodified polystyrene. In other words, "straight" polystyrene is "unmodified" polystyrene.

Rolls 16 and 18 are suitably heated such as, by way of example, by a water jacket or the like, whereby to have a surface temperature of from 165 to 175 degrees Fahrenheit.

Film 32 is drawn from roll 30 and is laid upon the outer surface of roll 16 whereby to be in contact with the outer surface of the heated roll throughout an arc of from between 135 to 180 degrees.

With reference now to Fig. 5, the numerals 34 denote, generally and graphically, the stresses inherent in the film as a result of its formation, it being noted that as said film passes over heated roll 16 (to the left), the lines of stress are diminished whereby to be completely relieved before the film is ready to pass from the heated roll. In this manner we have simply and effectively deorientated the film, that is, it has been relieved of the stresses and strains imparted thereto incident to its formation. Film 32 will be thoroughly heated by roller 16 not only to effect complete deorientation thereof, but also to convert it into a soft, plastic condition by the time it has traveled with the outer surface of the heated roll and is ready to be applied directly onto the outer surface of extruded sheet 14 and on top of inventory 20.

As the heat plasticized film 32 is thus introduced onto the hot plastic inventory, the temperature of which is in the range of from 375 to 360 degrees F., the film will be literally welded to the extruded sheet as it is uniformly compressed onto the inventory and into the upper surface of the sheet as the film and sheet are passed between rollers 16 and 18, whereby the composite sheet 14A, leaving the discharge side of the rollers, will compress a soft, hot, plastic sheet of about 300 degrees Fahrenheit temperature, the outer surface of which is defined by film 32.

The composite sheet 14A may be suitably conveyed, as on rollers 50 of Fig. 1, for permitting the sheet to cool, or the composite sheet may be fed directly to a vacuum forming process of the type which includes a battery of infra-red heat units for softening the composite sheet by raising its temperature to from 375 to 400 degrees F. for enabling it to be molded by a vacuum process, thereby utilizing the heat already in the finished composite sheet as it passes from rollers 16 and 18.

In Fig. 3 sheets of thin film 32 are being simultaneously applied to the upper and lower surfaces of extruded sheet 14 in exactly the same manner in which the film is applied to the upper surface of the sheet in Fig. 1.

From the foregoing, it will be noted that the final composite sheet will be of uniform thickness across its entire width and that the outer surface thereof will be smooth, hard and abrasion resistant. The bond between the thin film and sheet of high impact strength material is so perfect as to withstand repeated flexings of the composite sheet, without any indications of failure.

The quantity of inventory 20 required to successfully practice our method cannot be precisely defined, however the quantity of inventory must always be sufficiently small so that it will not undergo a "cooling" effect which would result in particles or slugs of the cooled inventory to pass into the completed sheet where they would appear as feed marks. However at the other extreme it should be noted that too small an amount of inventory will result in an improper and inadequate weld, since the inventory in effect comprises a sizing or an adhesive agent which is essential in order to provide a proper and permanent weld.

In order to teach others how to practice our method, the following statistics are given as illustrative of actual conditions under which we have produced, on a mass production basis, many hundreds of thousands of lineal feet of composite sheeting:

Soft sheet 14 is extruded at the rate of eighteen inches a minute, is approximately .070 inch thick across its width and has a temperature of 375–380 degrees F. Each of rollers 16 and 18 is four and a half inches in diameter and is heated by circulating hot water for maintaining a surface temperature of from 165 to 175 degrees F. The rolls are mounted on vertically aligned centers on a common vertical axis six inches from lips 12 of the extruder, and are synchronously rotated by any suitable means at peripheral speeds of eighteen inches a minute. The width of the film and extruded sheet is thirty-six inches and the temperature of the inventory is from 360 to 375 degrees F., whereas the temperature of the composite sheet leaving the rolls is about 300 degrees F. The thickness of the film is 1 mil and the thickness of the composite sheet 14A is uniformly .070 across its entire width.

The present invention contemplates the use of other compatible thermoplastic materials for the extruded sheet and film such as, by way of example, a Celluloid sheet to which a thin film of ethyl cellulose is welded into an inventory of Celluloid.

What is claimed is:

1. The process of making a composite sheet from a sheet of high impact polystyrene and a film of straight polystyrene, comprising continuously extruding a sheet of high impact polystyrene, continuously compressing a portion of said sheet throughout its width while at substantially its extrusion temperature, collecting from both sides of the sheet some of the material thereof across the width of the sheet immediately in advance of the compression area to form an inventory at substantially extrusion temperature, continuing the compression while moving the sheet and effecting a smoothing out of the inventory into the opposite faces of the sheet substantially throughout its width, and while said sheet is under compression at substantially extrusion temperature and movement thereof continued, feeding thereto and applying a preformed, deoriented, thin, highly flexible, straight polystyrene film onto the inventory on at least one face of the sheet, and compressing the film into the inventory thus forming a composite sheet of substantially the thickness of the extruded sheet, and simultaneously with such compression and movement of the sheet effecting a homogeneous weld of the film to the sheet and thus provide a hard, smooth, abrasion-resistant surface for the composite sheet.

2. The process of making a composite sheet from a sheet of high impact polystyrene and a film of straight polystyrene, comprising continuously extruding a sheet of high impact polystyrene, continuously compressing a portion of said sheet throughout its width while plastic and at substantially its extrusion temperature, collecting from both sides of the sheet some of the material thereof across the width of the sheet immediately in advance of the compression area to form an inventory at substantially extrusion temperature, continuing the compression while moving the sheet and effecting a smoothing out of the inventory into the opposite face of the sheet substantially throughout its width, and while said sheet is plastic and at substantially extrusion temperature and under compression and movement thereof continued, of feeding thereto and applying a preformed, deoriented, thin, highly flexible, straight polystyrene film at a temperature approximating half of the extrusion temperature of the sheet onto the inventory on at least one face of the sheet, and simultaneously compressing the film into the inventory and reducing the thickness of the sheet and inventory thus forming a composite sheet of substantially the thickness of the extruded sheet, and simultaneously with such compression and movement of the sheet effecting a homogeneous weld of the film to the sheet and thus provide a hard, smooth, abrasion-resistant surface for the composite sheet.

3. The process defined in claim 2, wherein the thickness of the film approximates one mil.

4. The process of making a composite sheet from a sheet of high impact polystyrene and a film of straight polystyrene, comprising continuously extruding a sheet of high impact polystyrene, continuously compressing a portion of said sheet throughout its width while plastic and at temperatures approximating its extrusion temperature of 375–380° F., collecting from both sides of the sheet some of the material thereof across the width of the sheets immediately in advance of the compression area to form a plastic inventory at temperatures approximating 360–375° F., continuing the compression while moving the plastic sheet and effecting a smoothing out of the plastic inventory into the opposite faces of the plastic sheet substantially throughout its width, and while said sheet is plastic, under compression, at substantially extrusion temperature and movement thereof continued, of feeding thereto and applying a preformed, deoriented, thin, highly flexible, straight polystyrene film at temperatures approximating 165–175° F. onto the hot, plastic inventory on at least one face of the sheet, and simultaneously compressing the film into the hot, plastic inventory and reducing the thickness of the sheet and inventory, thus forming a composite sheet of substantially the thickness of the extruded sheet, and simultaneously with such compression and movement of the hot, plastic sheet effecting a homogeneous weld of the film to the sheet and thus provide a hard, smooth, abrasion-resistant surface for the composite sheet.

5. The process of providing the mat surface of a sheet of extruded high impact polystyrene with a hard, smooth, continuous, abrasion-resistant surface of straight polystyrene film, which comprises the steps of continuously extruding a sheet of high impact polystyrene, continuously compressing a portion of said sheet throughout its width while soft, hot and plastic and at substantially its extrusion temperature, by passing said sheet directly to and between a pair of rotating compression rollers, of maintaining the rollers at temperatures approximating 165–175° F., of collecting from both sides of the sheet some of the material thereof across the width of the sheet immediately in advance of the compression area to form a soft, hot, plastic inventory at substantially extrusion temperature, of continuing the compression while moving the soft, hot, plastic sheet and effecting a smoothing out of the plastic inventory into the opposite faces of the plastic sheet substantially throughout its width, of continuously feeding a thin, preformed film of straight polystyrene onto one of said heated rollers for progressively heating and simultaneously deorienting the film as it is advanced on the heated roller, and while said extruded sheet is soft, hot and plastic, under compression, at substantially extrusion temperature and movement thereof continued, of feeding thereto and applying the said preformed, deoriented, thin, straight polystyrene film while at temperatures approximating 165–175° F. onto the soft, hot, plastic inventory on at least one face of the soft, hot sheet, and simultaneously compressing the film into said inventory and reducing the thickness of the sheet and inventory, thus forming a composite sheet of substantially the thickness of the extruded sheet, and simultaneously with such compression and movement of the soft, hot, plastic sheet effecting a homogeneous weld of the film to the sheet and thus provide a hard, smooth, abrasion-resistant surface on the extruded sheet.

References Cited in the file of this patent

UNITED STATES PATENTS

| Number | Name | Date |
|---|---|---|
| 1,777,309 | Hopkinson | Oct. 7, 1930 |
| 1,913,330 | Brickman | June 6, 1933 |
| 2,064,292 | Charch | Dec. 15, 1936 |
| 2,175,125 | Mack et al. | Oct. 3, 1939 |
| 2,281,635 | Strauss | May 5, 1942 |
| 2,404,073 | Karfiol et al. | July 16, 1946 |
| 2,444,094 | Duggan | June 29, 1948 |
| 2,462,331 | Myers | Feb. 22, 1949 |
| 2,510,908 | Schubert | June 6, 1950 |
| 2,536,048 | Flanagan | Jan. 2, 1951 |
| 2,582,294 | Stober | Jan. 15, 1952 |
| 2,608,717 | Kay | Sept. 2, 1952 |